Figure 6:
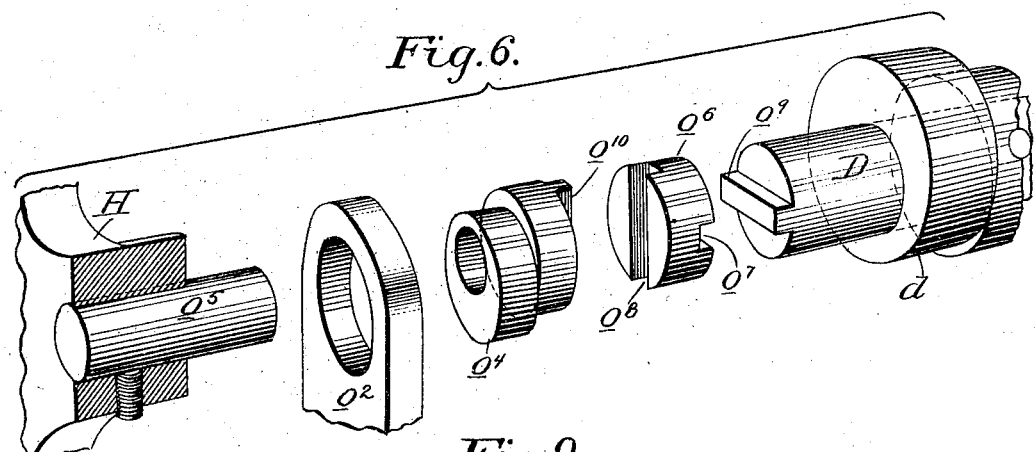

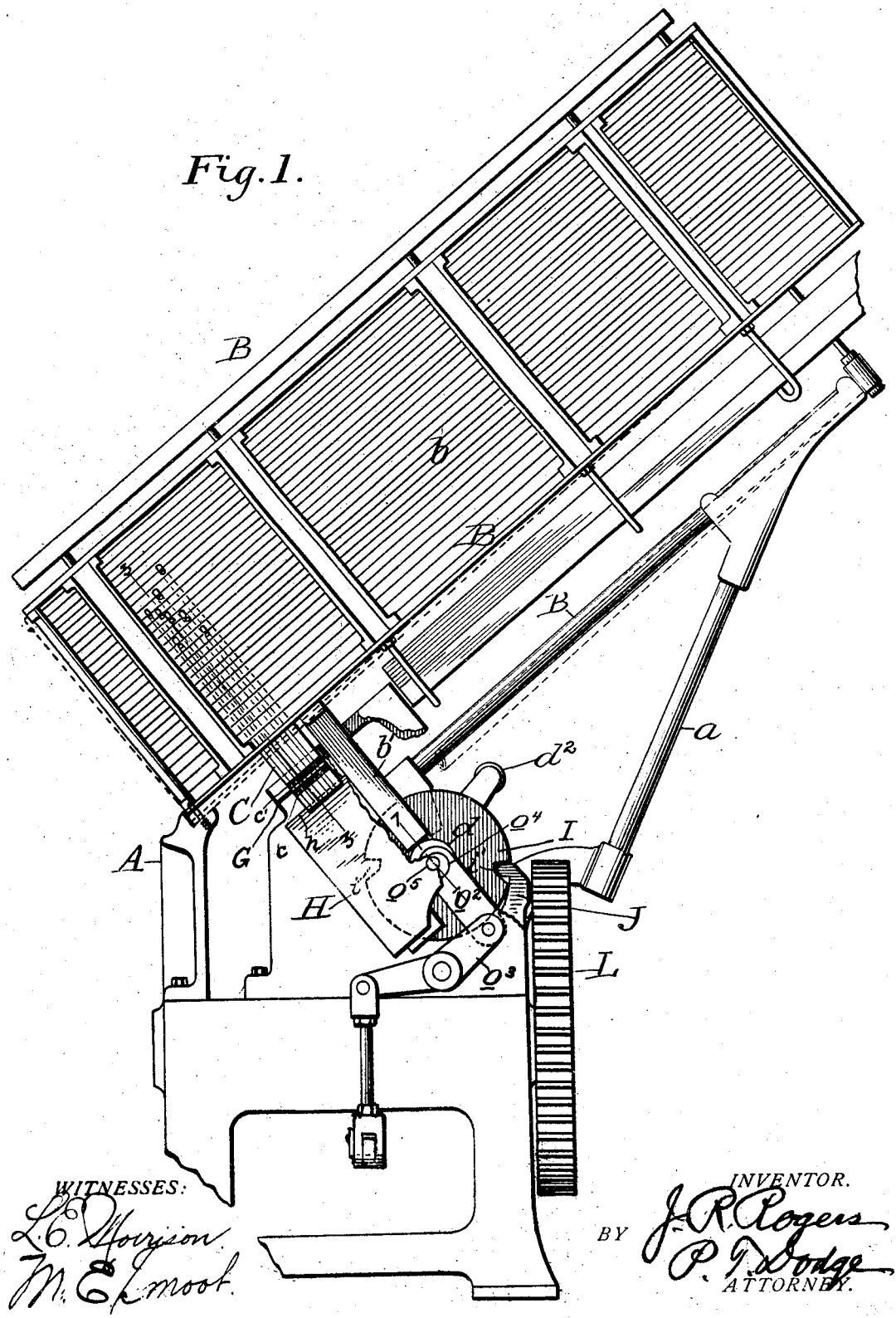

No. 861,770. PATENTED JULY 30, 1907.
J. R. ROGERS.
LINOTYPE MACHINE.
APPLICATION FILED MAR. 1, 1907.
5 SHEETS—SHEET 2.
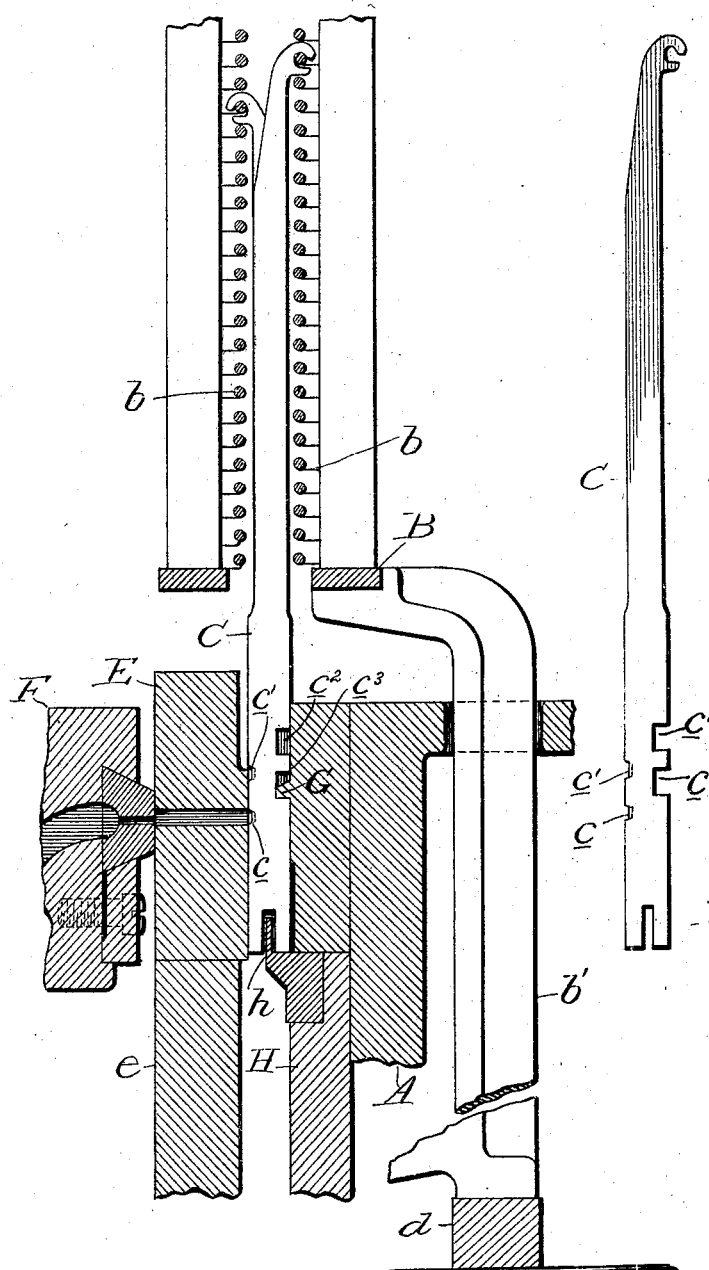
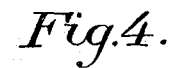
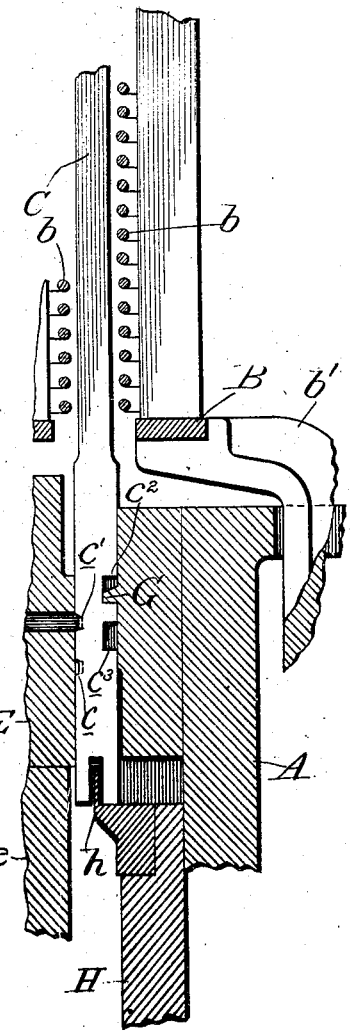
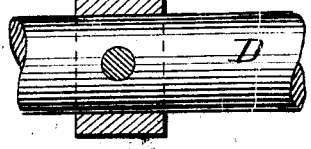
WITNESSES:
INVENTOR.
BY
ATTORNEY.

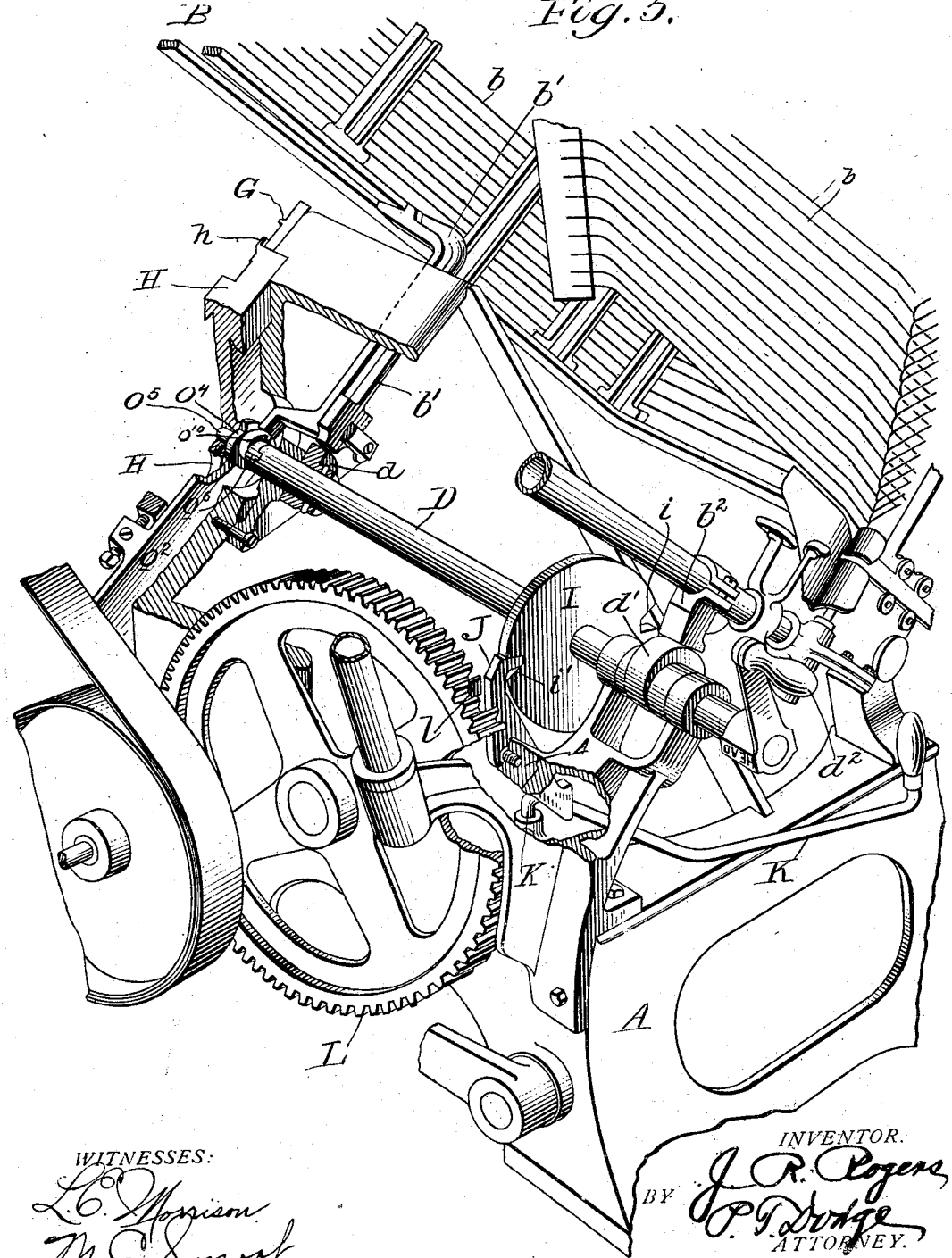

No. 861,770. PATENTED JULY 30, 1907.
J. R. ROGERS.
LINOTYPE MACHINE.
APPLICATION FILED MAR. 1, 1907.

5 SHEETS—SHEET 4.

WITNESSES:
INVENTOR.
J. R. Rogers
BY
ATTORNEY

No. 861,770. PATENTED JULY 30, 1907.
J. R. ROGERS.
LINOTYPE MACHINE.
APPLICATION FILED MAR. 1, 1907.
5 SHEETS—SHEET 5.
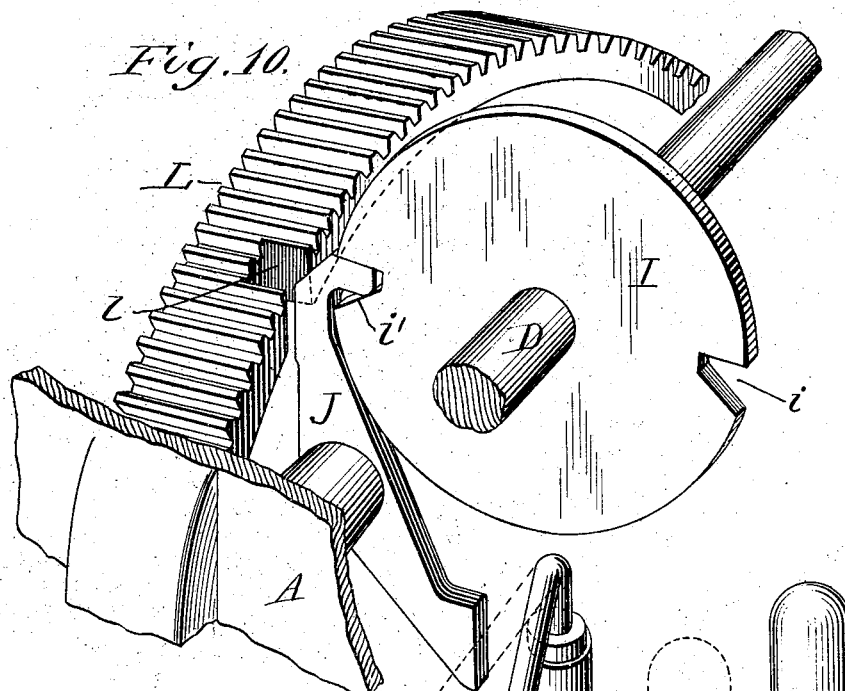
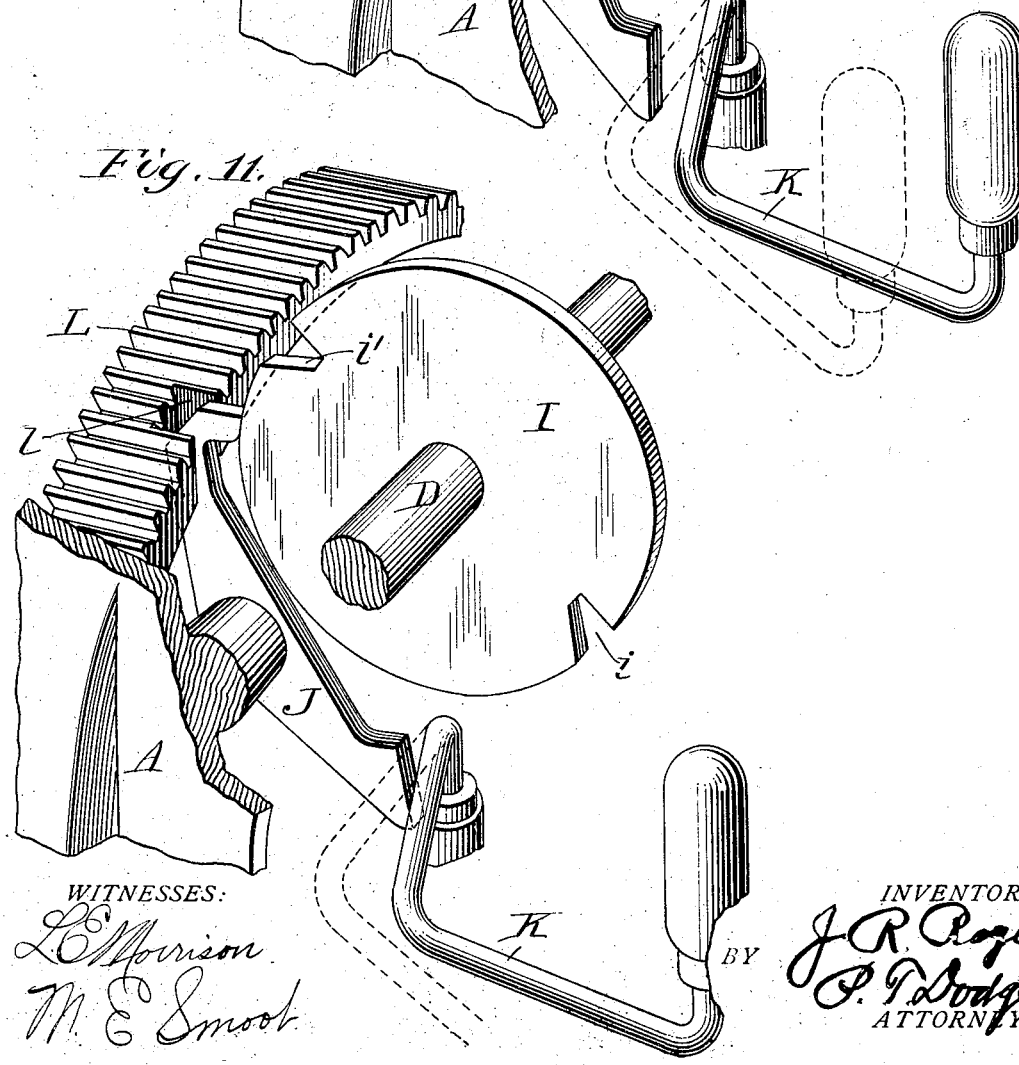
WITNESSES:
INVENTOR.
J. R. Rogers
BY P. T. Dodge
ATTORNEY.

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINOTYPE-MACHINE.

No. 861,770.  Specification of Letters Patent.  Patented July 30, 1907.

Application filed March 1, 1907. Serial No. 359,981.

*To all whom it may concern:*

Be it known that I, JOHN R. ROGERS, of the borough of Brooklyn, county of Kings, and State of New York, have invented new and useful Improvements in Linotype-Machines, of which the following is a specification.

My invention has reference to that class of machines for producing printing-bars or linotypes, in which the matrices are permanently suspended on converging wires or guides, which serve to bring the selected matrices together in a common line and sustain the line adjacent to the mold in which the linotypes or slugs are cast.

In the drawings I have shown my invention embodied in that particular form of machine represented in Letters Patent of the United States No. 679,481 granted to me on the 30th day of July, 1901. In this machine the parts are so constructed and arranged that the individual matrices released by finger-keys, descend by gravity along converging portions of the endless guides to the assembling point, whence they are carried by a traveling finger to the casting mechanism, and thence upward to the rear end of the machine, whence they descend along the diverging portions of the guides to their original places. In these machines, as represented in the patent and heretofore used commercially, there was a single set or font of matrices, each carrying a single character, and consequently the machines were adapted for producing a text face or reading face only.

The aim of the present invention is to adapt these machines to produce at will, in addition to the text face, a second face in italics or black letter. To this end I provide each of the matrices with plural independently usable characters, and mount the frame which carries the guides and which may be, as to the guides, the escapements for releasing the matrices, and the means for moving the composed line of matrices, in all respects like the frame shown in Patent No. 679,481 in such manner that it may be raised and lowered in relation to the casting mechanism, so that the matrices in the composed line suspended from the guides may be adjusted at will by the rising and falling movement of the guides to present their upper or their lower characters to the mold.

The invention also involves various details of construction connected with the alining of the matrices, the prevention of the casting action unless the matrices are properly alined, &c.

With the exception of the parts hereinafter described, the machine may be in all respects like that in the patent above referred to, or of any equivalent construction.

Figure 7:
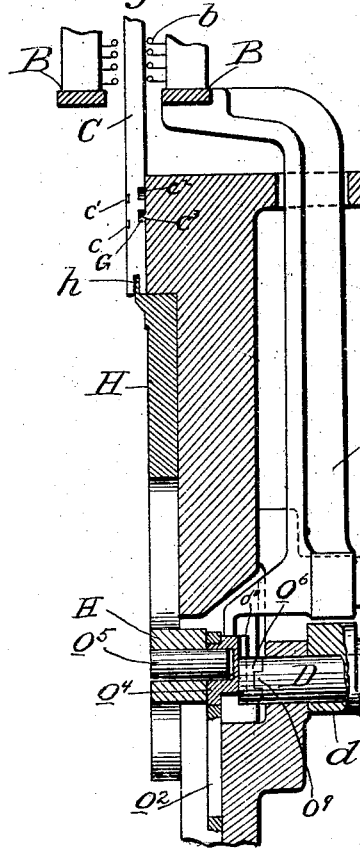
Figure 9:
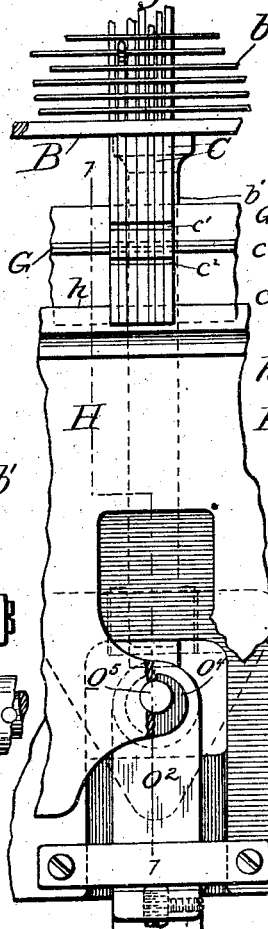
Figure 8:
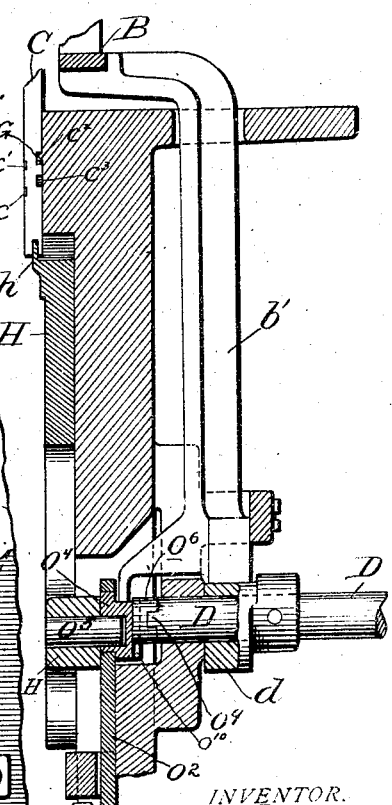

In the drawings,—Figure 1 is a side elevation in outline of a machine containing my improvement. Fig. 2 is a side view of one of the two-letter matrices used in the machine. Fig. 3 is a vertical section through the casting mechanism on the line 3—3 of Fig. 1, with the matrices in an elevated position in order to produce their lower characters on the slugs or linotypes. Fig. 4 is a similar view with the matrices in the lower position in order to produce their upper characters. Fig. 5 is a perspective view looking against the rear corner of the machine, and showing more particularly the devices for raising and lowering the guide-frame, certain portions being broken away to expose the internal construction. Fig. 6 is a perspective view showing the frame-lifting shaft and connections. Fig. 7 is a vertical cross-section through one end of the lifting shaft and adjacent parts on the line 7—7 of Figs. 1 and 9, with the frame in an elevated position. Fig. 8 is a similar view with the frame in the lower position. Fig. 9 is a side elevation of the parts shown in the preceding figure. Figs. 10 and 11 are perspective views illustrating more particularly means for preventing the action of the machine unless the guide-frame and matrices are in their proper positions.

Referring to the drawings, A represents the base-frame of the machine, which may be of any suitable form and construction, and B the inclined top-frame, provided with the wires or guides $b$, from which the matrices C are suspended. Each guide carries a group of matrices bearing the same letters, matrices bearing different characters being of different lengths so that when assembled side by side, their characters will be presented in a common line. The top-frame B is a rigid structure, having the guides $b$ secured rigidly therein, and it is sustained at its upper end on the elevated arm $a$ of the base-frame, the arrangement being such that the lower end of the frame B may rise and fall in relation to the base-frame to a limited extent,— usually about five-sixteenths of an inch. The lower end of the top-frame is provided with depending arms or legs $b'$ and $b^2$, which bear upon eccentrics $d$ and $d'$ at opposite ends of a rock-shaft D, which is seated in the base-frame and provided with an operating crank $d^2$ at one end. When the parts stand in the normal position, shown in Figs. 1 and 5, the eccentrics $d$, $d'$, hold the top-frame and guides in their uppermost position, but when the operator, by pulling the crank $d^2$ forward, rotates the shaft and eccentrics, the lower end of the top-frame is lowered to the position indicated in dotted lines in Fig. 1, thereby lowering the guide-wires $b$ and the matrices suspended therefrom.

Instead of constructing the matrices as usual, with a single letter or character, they are each provided in one edge with two characters $c$ and $c'$, located one above the other in position to be used independently. Ordinarily each matrix is provided with the same character in different forms, as for example a light face A and a bold face A, but any other combination of characters or faces may be used, provided they are of equal width. After the matrices are assembled for each line, they are transferred by the ordinary mechanism to the casting position shown in Fig. 1, where they are suspended in front of the mold, the upper and lower characters standing in two parallel lines, as shown.

E represents the slotted mold in which the slugs or linotypes are cast against the assembled line of matrices. This mold is mounted as heretofore, in a swinging arm $e$, and is presented momentarily behind and against the line of matrices and in front of the melting-pot F, having a perforated mouth to close the back of the mold and deliver molten metal thereto as usual.

Each matrix is provided in the opposite edge from the characters or matrices proper with two alining-notches $c^2$ and $c^3$. The base-frame is provided, as heretofore, with a rigid alining-rib G to enter one or the other of the notches in the matrices to insure the proper alinement of their characters. If the matrices are assembled while the top-frame is in the upper position, shown in Figs. 1 and 3, the matrices will be sustained at such height as to present their lower characters $c$ to the mold, and their lower notches $c^3$ to the alining rib G. As a consequence, the slugs or linotypes produced in the mold will bear upon their edges type corresponding to the characters $c$. If, on the contrary, the line is composed while the top frame is in the lower position, represented by dotted lines in Fig. 1, and by full lines in Fig. 4, the matrices will be caused to present their upper characters to the mold and their upper notches to the alining rib. Thus it will be seen that the operator is enabled, by simply moving the crank $d^2$ forward or backward, to cause the production of one type face or another on the slugs, as may be demanded. Consequently the machine is adapted for setting in connection with the reading matter, the head-lines or sub-heads in bold face or black face letters, or for setting in connection with the reading face, italic and small caps, it only being necessary to provide the matrices with the characters required, whatever they may be. Of course two black face or bold face characters of different forms may be used in the matrices for special classes of work, but this is not ordinarily required.

In order to insure the alinement of the matrices, I provide, as heretofore, a rising and falling slide H, mechanically actuated, and having on its upper end a blade or lip $h$ to enter notches in the lower ends of the matrices to keep them from twisting and turning out of position. This slide corresponds to the plate $o'$ in Patent #679,481, and in itself forms no part of the present invention. At the proper time it rises against the lower ends of the matrices and pushes them upward until the alining-rib G is firmly seated in the lower side of the notch. In the present machine it is necessary, for the first time, for this blade to have one operative position when the frame and matrices are lifted, and another when they are lowered. To provide for this, I adopt the construction shown in Fig. 1 and Figs. 6 to 9 inclusive. In these views $o^2$ represents a slide-operating link, receiving a motion from the lever $o^3$, these parts being essentially the same as in the original patent. Instead, however, of pivoting the actuating-link $o^2$ directly to the slide, as in the original machine, I now mount the upper end of the link on an eccentric $o^4$, mounted to turn on a stud $o^5$ secured to the alining-slide H, as shown particularly in Figs. 6, 8 and 9. When this eccentric, which rises and falls with the slide, is turned down to the position shown in Fig. 7, the link serves to raise the slide to its uppermost position for the production of the lower characters in the matrices, but when the eccentric is turned up to the position shown in Fig. 8, it in effect shortens the link, and the slide H is raised only to its lower position for producing the upper matrix characters. For the purpose of automatically turning this eccentric to correspond with the position of the top-frame, I connect it by a universal and sliding joint with the end of the frame-lifting shaft D. This joint may be of any suitable form, but as shown in Fig. 6, it comprises a block $o^6$, having in opposite faces grooves $o^7$ and $o^8$ at right angles to each other, one of these grooves receiving a rib $o^9$ on the end of the shaft, while the other receives a rib $o^{10}$ on the eccentric $o^4$. This arrangement admits of the shaft D turning the eccentric $o^4$ so as to determine the position of the alining-slide H, and at the same time admits of the eccentric moving up and down with the slide and link without disturbing the connection to the shaft.

From the foregoing it will be understood that when the rock-shaft is turned, it not only raises or lowers the top-frame and the alining-matrices suspended therefrom, but also varies the rising and falling motion of the alining-slide H.

In order to prevent the operator from setting the casting mechanism in action in the event of the top-frame being in an intermediate position, so as to present the matrices in improper relation to the mold, I propose to provide means to prevent the machine from being started unless the top-frame is fully up or fully down. These devices may be made in a great variety of forms, but as shown in the drawings, Figs. 1, 5, 10, 11, &c., they consist simply of a disk I mounted on the main-shaft and a lever J mounted on the main-frame. The disk is provided in opposite sides with two notches $i$ and $i'$, and the lever J, pivoted at a central point, has its opposite ends adapted to enter these notches alternately as the lifting-shaft D completes its motion in opposite directions. The lower end of the arm J is in position to act upon the starting-lever K, controlling the machine in the same manner as the starting-lever of the patent above referred to. The upper end of the lever stands opposite the main gear-wheel L, which is provided in one edge with a notch $l$. When the machine is at rest, the upper end of the lever stands opposite the notch $l$, as shown in Fig. 10, and when the top-frame is in its uppermost or lowermost position, the upper end of the lever will rest in one or the other of the notches therein, and its lower end will stand clear of the lever K, so that it may be operated to start the machine as usual. Whenever the top-frame is in an intermediate position, the upper end of the lever will rest on the periphery of the disk, as shown in Fig. 11, and its lower end will lock the starting lever K so that it cannot be moved. Consequently it is necessary for the operator to properly adjust the top-frame so as to insure the proper presentation of the matrices to the mold before the machine can be started.

The essence of my invention lies in mounting the guides by which the matrices are carried, so that they may be raised or lowered in order to present the assembled matrices, having two characters each, in higher or lower relation to the mold, and it is manifest that the details of construction may be widely modified without changing the mode of action or passing beyond the limits of my invention.

The construction of the top-frame, the manner of supporting the same, and the means for raising and lowering it may be varied at the pleasure of the constructor, provided they retain a mode of action essentially such as that herein described.

In practice, it is advisable to raise the top-frame just before the movement of the alining-slide takes place. The object of this action is to take up the slack or looseness in the eyes of the matrices, and raise them into engagement with the alining-rib to approximate alinement before the final action of the slide, which will correct the exceedingly slight deviations which occur in practice.

It is to be observed that in my organization, the matrices are mounted permanently on their respective guides, and that these guides serve not only to bring the selected characters together in line, but also to sustain the composed line and further to effect the vertical adjustment of the line in relation to the mold.

I believe the present to be the first instance in which the matrices having two characters each, have been combined with a mold and with vertically adjustable guides serving to sustain the matrices and carry them to their operative position, and also to determine the adjustment of the matrices vertically in relation to the mold.

Having described my invention, I claim and desire to secure by Letters Patent:—

1. In a linotype machine, the combination of a mold, a series of two-letter matrices, guides from which the respective matrices are suspended, and means for raising and lowering the guides to present their upper or lower characters to the mold at will; whereby the guides are adapted to sustain the composed line of matrices and also to effect the presentation of their upper or lower characters to the mold as demanded.

2. In a linotype machine, the combination of a base-frame, a mold sustained thereby, a top-frame sustained by the base-frame and provided with a series of guides, two-letter matrices suspended from the respective guides, and means for raising and lowering the top-frame and its guides in relation to the mold a distance equal to that between the upper and lower matrix characters; whereby the guides are adapted to present the matrices with their upper or their lower characters to the mold.

3. In a linotype machine, the combination of the base-frame and a mold mounted therein, a top-frame provided with inclined guides and mounted to rock about a point near its rear end, two-letter matrices suspended therefrom, and means for raising and lowering the forward end of said frame.

4. In a linotype machine, the combination of the base-frame and the mold therein, the inclined top-frame provided with guides and mounted to rock about an axis near its upper end, two-letter matrices suspended from said frame, and an eccentric mechanism for raising and lowering the lower end of said frame.

5. In a linotype machine, a frame and a mold therein, in combination with two-letter matrices, means for controlling the position of the matrices vertically in relation to the mold, the plate against which the matrices are alined in casting position, and an alining-slide having two operative positions.

6. In a linotype machine, the combination of the base-frame and mold, the top-frame, two-letter matrices suspended from said frame, a rib against which the matrices are alined, a slide to seat the matrices against the alining-rib, and connected devices for changing the height of the top frame and also changing the movement of the slide correspondingly; whereby the operator is enabled at will to present the upper or the lower matrix characters to the mold and to cause their alinement.

7. In a linotype machine, the combination of a mold, two-letter matrices, means for supporting the assembled matrices in front of the mold, means for raising and lowering the matrix support that the upper or the lower characters may be presented to the mold, and means connected therewith to prevent the starting of the machine when the matrix-support is in an intermediate position.

8. In a linotype machine and in combination, the base-frame, a mold therein, two-letter matrices, a rising and falling frame sustaining the matrices, the eccentrics for raising and lowering said frame, a notched disk I, the starting lever K, and an intermediate member through which the disk controls the starting lever.

9. In a linotype machine, and in combination with the top-frame having matrices suspended therefrom, the rock-shaft D, its eccentrics, the disk I, lever J, and starting lever K.

10. In a linotype machine, and in combination with the rising and falling top frame, the rock-shaft and eccentrics to raise and lower the same, the matrix-alining slide H, its actuating link, and the variable connection between the slide and link, said connection controlled by the rock-shaft.

11. In a linotype machine, in combination with the alining slide H, its actuating link $o^2$, and the eccentric $o^4$, the rock-shaft D, and the yielding connection between said shaft and eccentric.

12. In a linotype machine in combination with two-letter matrices and means for alining the same in two positions, an alining slide H, and actuating mechanism adapted to give said slide two operative positions.

In testimony whereof I hereunto set my hand this seventh day of February, 1907, in the presence of two attesting witnesses.

JOHN R. ROGERS.

Witnesses:
 D. S. KENNEDY,
 E. C. MORIARTY.